US008473997B2

(12) United States Patent
Qiu et al.

(10) Patent No.: US 8,473,997 B2
(45) Date of Patent: Jun. 25, 2013

(54) CHANNEL CHANGING METHOD, APPARATUS, AND SYSTEM

(75) Inventors: Zhigang Qiu, Shenzhen (CN); Kai Guo, Nanjing (CN); Wenle Yang, Shenzhen (CN); Xia Qin, Nanjing (CN); Hewen Zheng, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/566,647

(22) Filed: Aug. 3, 2012

(65) Prior Publication Data

US 2012/0304236 A1    Nov. 29, 2012

Related U.S. Application Data

(63) Continuation of application No. PCT/CN2011/072648, filed on Apr. 12, 2011.

(30) Foreign Application Priority Data

Jun. 10, 2010    (CN) .......................... 2010 1 0200935

(51) Int. Cl.
H04N 7/173    (2011.01)

(52) U.S. Cl.
USPC ........................... 725/116; 725/109; 725/131

(58) Field of Classification Search
None
See application file for complete search history.

(56) References Cited

U.S. PATENT DOCUMENTS

| 7,711,011 B2* | 5/2010 | Choi et al. ................... 370/535 |
| 7,769,035 B1* | 8/2010 | Breau et al. .................. 370/412 |
| 2002/0024970 A1* | 2/2002 | Amaral et al. ............... 370/468 |
| 2004/0160974 A1* | 8/2004 | Read et al. ................... 370/431 |
| 2006/0290808 A1* | 12/2006 | Choi et al. .................... 348/468 |
| 2007/0011343 A1* | 1/2007 | Davis et al. ................... 709/231 |
| 2007/0107026 A1* | 5/2007 | Sherer et al. .................... 725/97 |
| 2007/0204320 A1 | 8/2007 | Wu et al. |

(Continued)

FOREIGN PATENT DOCUMENTS

| CN | 1960485 A | 5/2007 |
| CN | 101102475 A | 1/2008 |

(Continued)

OTHER PUBLICATIONS

International Search Report issued in corresponding PCT Patent Application No. PCT/CN2011/072648, mailed Jun. 30, 2011.

*Primary Examiner* — Chris Parry
*Assistant Examiner* — William J Kim
(74) *Attorney, Agent, or Firm* — Brinks Hofer Gilson & Lione

(57) ABSTRACT

Embodiments of the present disclosure provide a channel changing method, apparatus, and system. A network side device records in real time a timestamp of a media packet of a multicast media stream which enters a buffer, and a key frame which enters the buffer; when a terminal's channel changing request has been detected, obtains a first timestamp of a media packet which enters the buffer at a channel changing request moment, and a second timestamp of a media packet in which a key frame which is of the target channel and is the last to enter the buffer is located in the media packet; determines a timestamp difference between the first timestamp and the second timestamp; and transmits the timestamp difference and a burst media stream of the target channel to the terminal. In the embodiments of the present disclosure, a delay in playing the multicast media stream by the terminal is reduced.

11 Claims, 8 Drawing Sheets

U.S. PATENT DOCUMENTS

| | | | |
|---|---|---|---|
| 2008/0022320 A1 | 1/2008 | Ver Steeg | |
| 2009/0080864 A1* | 3/2009 | Rajakarunanayake | 386/124 |
| 2009/0083813 A1* | 3/2009 | Dolce et al. | 725/93 |
| 2009/0148131 A1* | 6/2009 | Akgul | 386/84 |
| 2009/0262252 A1* | 10/2009 | Wan | 348/731 |
| 2010/0111108 A1* | 5/2010 | Akgul et al. | 370/474 |
| 2010/0189124 A1 | 7/2010 | Einarsson et al. | |

FOREIGN PATENT DOCUMENTS

| | | |
|---|---|---|
| CN | 101207822 A | 6/2008 |
| CN | 101316357 A | 12/2008 |
| CN | 101690118 A | 3/2010 |
| CN | 101854533 A | 10/2010 |

* cited by examiner

CHANNEL CHANGING METHOD, APPARATUS, AND SYSTEM

CROSS-REFERENCE TO THE RELATED APPLICATIONS

This application is a continuation of International Application No. PCT/CN2011/072648, filed on Apr. 12, 2011, which claims priority to Chinese Patent Application No. 201010200935.6, filed on Jun. 10, 2010, both of which are hereby incorporated by reference in their entireties.

FIELD

The present disclosure relates to the field of web television technologies, and in particular, to a channel changing method, apparatus, and system.

BACKGROUND

An Internet Protocol Television (Internet Protocol Television, IPTV) system has gained a wide application. However, a problem of delay exists during a channel changing process. There are many reasons why a delay exists during IPTV channel changing. The most important reason is that it takes time to wait for a key frame that can be independently decoded because a terminal can perform playing only when a media stream carrying the key frame is received.

To shorten the delay during the channel changing process, the prior art proposes a fast channel change (Fast Channel Change, FCC) mechanism. The basic idea is to deploy an FCC server on a network side and buffer, by the FCC server, a multicast media stream transmitted by a multicast device. When receiving a channel changing request transmitted by a terminal, the FCC server selects, from a buffer, a key frame closest to a channel changing moment, and starting from the key frame, unicasts the buffered multicast media stream (a media stream unicasted by the FCC server to the terminal, referred to as a burst media stream) to the terminal at a rate higher than a normal rate on a multicast channel. In this way, before receiving a multicast media stream transmitted by the multicast device corresponding to a target channel, the terminal may play the burst media stream transmitted by the FCC server in a unicast manner, so that users can watch program content on the target channel as soon as possible.

However, the content of the burst media stream transmitted by the FCC server to the terminal in a unicast manner is earlier than that of the multicast media stream transmitted by the multicast device, and the transmission rate of the burst media stream is higher than the rate of the multicast media stream. That is, the transmission rate of the burst media stream is higher than the decoding rate of the terminal. Therefore, when the terminal receives the multicast media stream, a burst media stream that has not been decoded may still be buffered in the buffer. This part of burst media stream that has not been decoded may cause that the content played by the terminal is staler than the content played by other terminals that have not undergone a fast channel change. That is to say, compared with the terminals that have not undergone channel changing, the terminal that has undergone channel changing plays the multicast media stream with a delay.

SUMMARY

Embodiments of the present disclosure provide a channel changing method, apparatus, and system which help to reduce a delay in playing a multicast media stream after a fast channel change.

An embodiment of the present disclosure provides a channel changing method, including: recording in real time a timestamp of a media packet of a multicast media stream which enters a buffer and a key frame which enters the buffer; when a channel changing request transmitted by a terminal has been detected, obtaining, according to the recorded timestamp, a first timestamp of a media packet which is of a target channel and enters the buffer at a channel changing request moment, and a second timestamp of a media packet in which a key frame which is of the target channel and is the last to enter the buffer before the channel changing request moment is located; determining a timestamp difference between the first timestamp and the second timestamp; and transmitting the timestamp difference to the terminal, and starting from the key frame, transmitting, in a unicast manner, a burst media stream of the target channel in the buffer to the terminal; where the timestamp difference is used for the terminal to rectify a timestamp of a media packet in a media stream which is received after the channel changing request moment, and the media stream which is received after the channel changing request moment includes the burst media stream.

An embodiment of the present disclosure provides a channel changing method, including: transmitting a channel changing request to a network side device, where the channel changing request carries information of a target channel; receiving a timestamp difference transmitted by the network side device, and a media stream which is of the target channel and is transmitted by the network side device; where the media stream of the target channel includes a burst media stream which is of the target channel and is received after the channel changing request is transmitted, or a burst media stream and a multicast media stream of the target channel which are received after the channel changing request is transmitted; and rectifying, according to the timestamp difference, a timestamp of a media packet of the media stream and playing the media stream, and stopping rectification when a sum of timestamp interval values that are after rectification and between neighboring media packets in the rectified media stream reaches the timestamp difference.

An embodiment of the present disclosure provides a channel changing apparatus, including: a recording module, configured to record in real time a timestamp of a media packet of a multicast media stream which enters a buffer, and a key frame which enters the buffer; a timestamp obtaining module, configured to, when a channel changing request transmitted by a terminal has been detected, obtain, according to the recorded timestamp, a first timestamp of a media packet which is of a target channel and enters the buffer at a channel changing request moment, and a second timestamp of a media packet in which a key frame which is of the target channel and is the last to enter the buffer before the channel changing request moment is located; a timestamp difference determining module, configured to determine a timestamp difference between the first timestamp and the second timestamp; and a transmitting module, configured to transmit the timestamp difference to the terminal, and starting from the key frame, transmitting, in a unicast manner, a burst media stream of the target channel in the buffer to the terminal; where the timestamp difference is used for the terminal to rectify a timestamp of a media packet of the media stream which is received after the channel changing request moment, and the media stream which is received after the channel changing request moment includes the burst media stream.

An embodiment of the present disclosure provides a terminal, including: a changing requesting module, configured to transmit a channel changing request to a network side device, where the channel changing request carries information of target channel; a timestamp difference receiving module, configured to receive a timestamp difference transmitted by the network side device; a media stream receiving module, configured to receive a media stream which is of the target channel and is transmitted by the network side device; where the media stream of the target channel includes a burst media stream of the target channel, or the burst media stream of the target channel and a multicast media stream which is transmitted by the network side device and is received by the terminal after the terminal joins in a multicast group corresponding to the target channel; and a rectifying and playing module, configured to rectify, according to the timestamp difference, a timestamp of a media packet of the media stream and play the media stream, and stop rectification when a sum of timestamp interval values that are after rectification and between neighboring media packets in the rectified media stream reaches the timestamp difference.

An embodiment of the present disclosure provides a channel changing system, including the foregoing channel changing apparatus and the foregoing terminal, and further including a multicast device, configured to transmit a multicast stream to the terminal after the terminal joins in a multicast group corresponding to a target channel.

In the channel changing method, apparatus, and system provided in the embodiments of the present disclosure, the network side device records a timestamp of a media packet that is of a multicast media stream of each channel and is the latest to enter the buffer, so that a timestamp difference between a timestamp of a media packet that is of the multicast media stream of the target channel and is the latest to enter the buffer and a timestamp of a media packet in which a key frame that is closest to the channel changing moment and in the buffer is located is calculated when the channel changing request is received from a terminal. When the burst media stream is unicasted to the terminal, the timestamp difference is transmitted to the terminal, so that before transmitting the burst media stream to a decoding apparatus, the terminal rectifies the timestamp of the media packet which is received after the channel changing request moment. In this way, the delay in playing multicast media streams by the terminal is reduced, and the terminal that has undergone channel changing is enabled to play the multicast media stream synchronously with a terminal that has not undergone channel changing.

DETAILED DESCRIPTION OF THE EMBODIMENTS

The embodiments of the present disclosure are further illustrated in detail below in combination with accompanying drawings and specific embodiments.

In an IPTV system, a live program is transported by a multicast device in a multicast manner. After channel changing is performed on a terminal having a processor, the multicast device transmits the multicast media stream of a target channel to the terminal. A successful channel changing for a terminal is divided into three stages: The terminal requests channel changing; an FCC server unicasts a burst media stream to the terminal after channel changing signaling of the terminal has been detected; the terminal receives the burst media stream including a first complete key frame and then performs playing. Time consumption is required because the terminal needs to wait for a key frame. An IPTV system using MPEG2 for coding is taken for example, where after transmitting a channel changing request, the terminal needs to wait for a media stream including a start intra-coded frame (Intra-coded Frame, I frame for short). The I frame may be independently decoded and presented, but a predicted frame (Predicted Frame, P frame for short), a bi-directional predicted frame (Bi-direction Predicted Frame, B frame for short) and so on, can be decoded and presented only after I frames to which they refer are received. Therefore, after transmitting the channel changing request, the terminal can perform playing only after receiving the media stream including the I frame.

Figure 1:
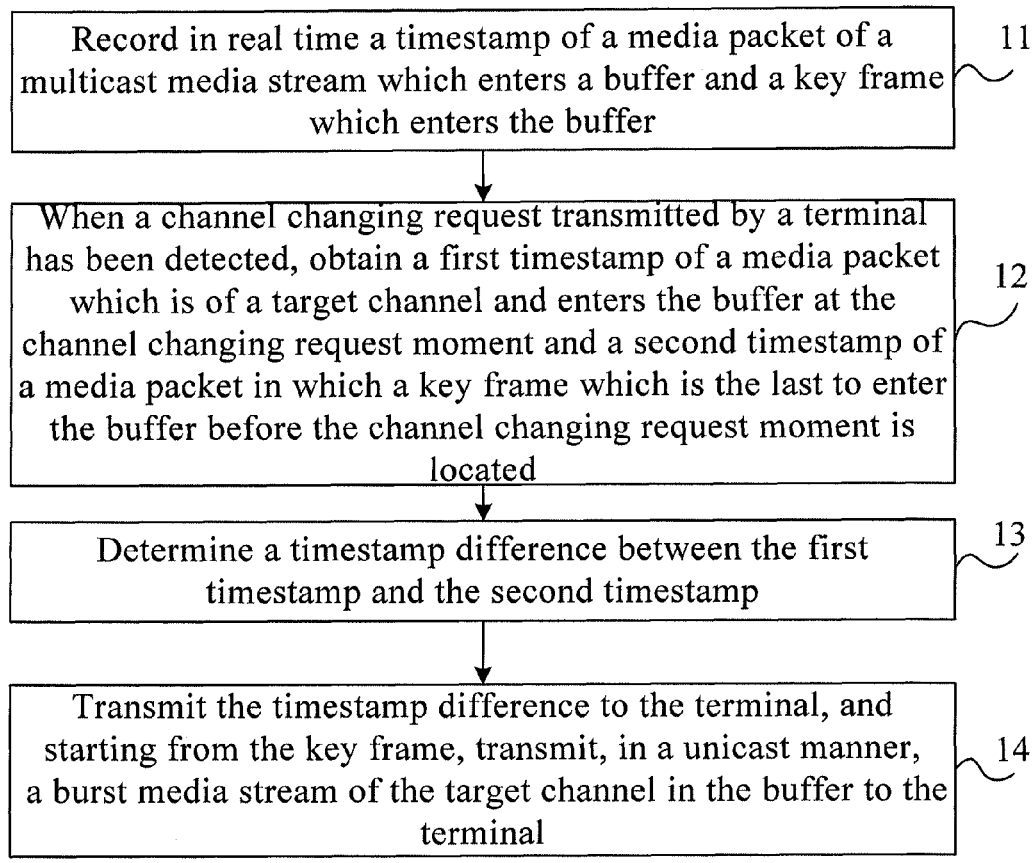
FIG. 1 is a flowchart of a channel changing method according to an embodiment of the present disclosure.

FIG. 1 is a flowchart of a channel changing method according to an embodiment of the present disclosure. An execution body in this embodiment is a network side device, for example, an FCC server having a processor or a network node in an IPTV system. As shown in FIG. 1, this embodiment includes:

Step 11: Record in real time a timestamp of a media packet of a multicast media stream which enters a buffer, and a key frame which enters the buffer.

A multicast media stream of each channel is buffered in advance on the network node or FCC server which provides a fast channel change.

If a bearing format of a media stream is a real-time transport protocol (Real Time Transport, RTP for short) packet, a timestamp field value in the RTP packet is recorded; if a bearing format of the media stream is a transport stream (Transport Stream, TS for short) using the moving pictures experts group (Moving Pictures Experts Group, MPEG for short), field values of a decode timestamp (Decode Time Stamp, DTS for short) and a presentation timestamp (Presentation Time Stamp, PTS for short) in a TS packet which enters the buffer.

Key frame identification is performed on the received multicast media stream so as to indicate a key frame that can be independently decoded. After the key frame identification is performed, a key frame identifier is recorded in the buffer on a network side, so that when the channel changing request of the terminal is received, the key frame which is the last to enter the buffer is found in real time before a channel changing moment.

If audio data and video data are in different media streams, that is, an audio stream and a video stream are transported separately (for example, in the RTP protocol, the audio stream and the video stream are transported separately, while in the TS protocol, the audio stream and the video stream are combined into one media stream for transportation), a timestamp of a multicast audio stream which enters the buffer and a timestamp of a multicast video stream which enters the buffer are separately recorded in real time. In a multi-audio channel system, timestamps of multiple audio streams which enter the buffer needs to be recorded in real time.

Step 12: When a channel changing request transmitted by a terminal has been detected, obtain a first timestamp of a media packet which is of a target channel and enters the buffer at a channel changing request moment, and a second timestamp of a media packet in which a key frame which is of the target channel and is the last to enter the buffer before the channel changing request moment is located.

At the moment when the channel changing request is received from the terminal, timestamps of two media packets need to be determined. The two media packets are a multicast media packet which is of the target channel and enters the buffer at the channel changing request moment and a multicast media packet in which the key frame of the target channel which is the last to enter the buffer (the key frame that is closest to the channel changing moment and is in the buffer) is located. In the timestamp recorded in step 11, the timestamp of the foregoing first media packet is obtained and recorded as the first timestamp. In the key frame recorded in step 11, the last frame that enters the buffer before the channel changing request moment is obtained first, the media packet in which the key frame is located is searched for, and in the timestamp recorded in step 11, the timestamp of the media packet in which the key frame is located is obtained and recorded as the second timestamp.

If the audio data and the video data are in different media streams, the following information needs to be obtained:

A first audio timestamp and a first video timestamp of a audio packet and a video packet of the target channel, where the audio packet and the video packet of the target channel enter the buffer at the channel changing request moment, are obtained separately; and a second audio timestamp of the last audio packet that enters the buffer before the channel changing request moment and a second video timestamp of a video packet in which a key frame which is the last to enter the buffer before the channel changing request moment are obtained separately.

Step 13: Determine a timestamp difference between the first timestamp and the second timestamp.

After the channel changing request is sent, only when a media stream including a key frame is received, the terminal can play the received media stream. Therefore, the key frame in the buffer closest to the channel changing moment needs to be determined, so that starting from the key frame, the media stream is transmitted in a unicast manner to the terminal. The timestamp of the multicast media packet in which the frame key is located is smaller than a timestamp of a multicast media packet that is the latest (at the channel changing moment) to enter the buffer. Therefore, the difference between the timestamps of the foregoing two multicast media packets can reflect how much a playing time point of a burst media stream on the terminal which that has undergone channel changing is later than a playing time point on a terminal that has not undergone channel changing, in other words, an extent to which the content of the burst media stream received by the terminal is staler than that of a real-time multicast media stream of the target channel, or a delay in playing, by the terminal, the multicast media stream which is received after the terminal join in the multicast group. A value of a parameter controlling a playing rate on the terminal is the value of the timestamp. Therefore, during calculation of the timestamp difference, the timestamp does not need to be transformed to a time value through operation.

If the audio data and the video data are in different media streams, during calculation of the timestamp difference, an audio timestamp difference between the first audio timestamp and the second audio timestamp, and a video timestamp difference between the first video timestamp and the second video timestamp need to be determined separately. The number of timestamp differences depends on the numbers of audio streams and video streams during a transport process. In a multi-audio channel system, there are multiple audio streams, and multiple audio timestamp differences need to be calculated.

Step 14: Transmit the timestamp difference to the terminal, and starting from the key frame, transmit, in the unicast manner, a burst media stream of the target channel in the buffer to the terminal.

The timestamp difference is used to rectify a timestamp of a media packet of a media stream which is received after the channel changing request moment. The media stream which is received after the channel changing request moment includes the burst media stream.

After transmitting the channel changing request, only when the media stream including the key frame is received, the terminal can perform playing. Therefore, starting from the media packet in which the key frame is located, the network side transmits the burst media stream to the terminal in the unicast manner. When a media packet of the burst media stream which is transmitted by the network side device to the terminal in the unicast manner is the same as the first media packet received by the terminal from a multicast device, the network side stops unicasting the burst media stream to the terminal.

The network side device may transmit the timestamp difference to the terminal in multiple manners. For example, in a case where there is no unicast interaction signaling, the timestamp difference is carried in the first media packet of the burst media stream which is transmitted to the terminal in the unicast manner. In a case where there is unicast interaction signaling, a channel changing response message is transmitted to the terminal, where the timestamp difference is carried in the channel changing response message.

After receiving the timestamp difference, starting from the first media packet of the burst media stream, the terminal rectifies a timestamp of a media packet transmitted to a decoding module and performs playing. When the terminal plays the multicast media stream of the target channel synchronously with other terminals that have not undergone channel changing, the terminal stops timestamp rectification on the received media stream. The main purpose of the terminal rectifying the timestamp of the media stream is to increase a rate at which the terminal plays the media stream (to quicken the speed of playing the media stream). That is, within a same period of time, the terminal that has undergone channel changing plays more media packets than the terminal that has not undergone channel changing, which shortens a delay in watching a program by a user of the terminal.

If the audio data and the video data are in different media streams, a burst audio stream and a burst video stream need to be separately transmitted to the terminal in the unicast manner. A method for determining a first audio media packet of the burst audio stream, a method for determining a first video media packet of the burst video stream, and a method for stopping transmitting the burst audio stream and the burst video stream in the unicast manner are similar the methods in step 14. The first audio media packet of the burst audio steam is an audio media packet which is the last to enter the buffer before the channel changing request moment; and the first video media packet of the burst video stream is a video media packet in which the key frame which is the last to enter the buffer before the channel changing request moment is located.

The method for transmitting the audio timestamp difference and the video timestamp difference to the terminal is as follows:

In the case where there is no unicast signaling, when the burst audio stream is transmitted to the terminal in the unicast manner, the first audio media packet carries the audio timestamp difference; when the video stream is transmitted to the terminal in the unicast manner, the video timestamp difference is carried in the first video media packet. In the case where there is unicast interaction signaling, a changing response message is first transmitted to the terminal, where the changing response message carries the audio timestamp difference and the video timestamp difference, and then the burst audio stream and the burst video stream are unicast to the terminal separately.

When the audio data and the video data are in different media streams, after receiving the audio timestamp difference and the video timestamp difference, the terminal rectifies a timestamp of a media packet of a received audio stream according to the audio timestamp difference, and rectifies a timestamp of a media packet of a received video stream according to the video timestamp difference, so that synchronized playing of audio and video is implemented.

In this embodiment, the network side records in real time a timestamp of a media packet that is of a multicast media stream of each channel and is the latest to enter the buffer. In this way, a timestamp difference between a timestamp of a media packet that is of the multicast media stream of the target channel and is the latest to enter the buffer and the timestamp of the media packet in which the key frame that is closest to the channel changing moment and is in the buffer is located is calculated at the moment when the channel changing request of the terminal is received. The timestamp difference is transmitted to the terminal when or before the burst media stream is transmitted to the terminal in the unicast manner, so that before playing the media stream which is received after the channel changing request moment, the terminal rectifies the timestamp of the media packet in the media stream according to the timestamp difference, so that within a same period of time, the terminal plays more media streams than the terminal that has not undergone channel changing. In this way, the delay in playing the multicast media stream by the terminal is reduced, and the terminal that has undergone channel changing plays the multicast media stream synchronously with the terminal that has not undergone channel changing. Further, when the audio data and the video data are transported separately, the timestamp transmitted by the network side includes an audio timestamp difference of each audio stream and a video timestamp difference of each video stream, so that the terminal rectifies the timestamp of the received audio stream and the timestamp of the received video stream according to the audio timestamp difference and the video timestamp difference respectively, so that synchronized playing of the audio and video is implemented.

Figure 2:
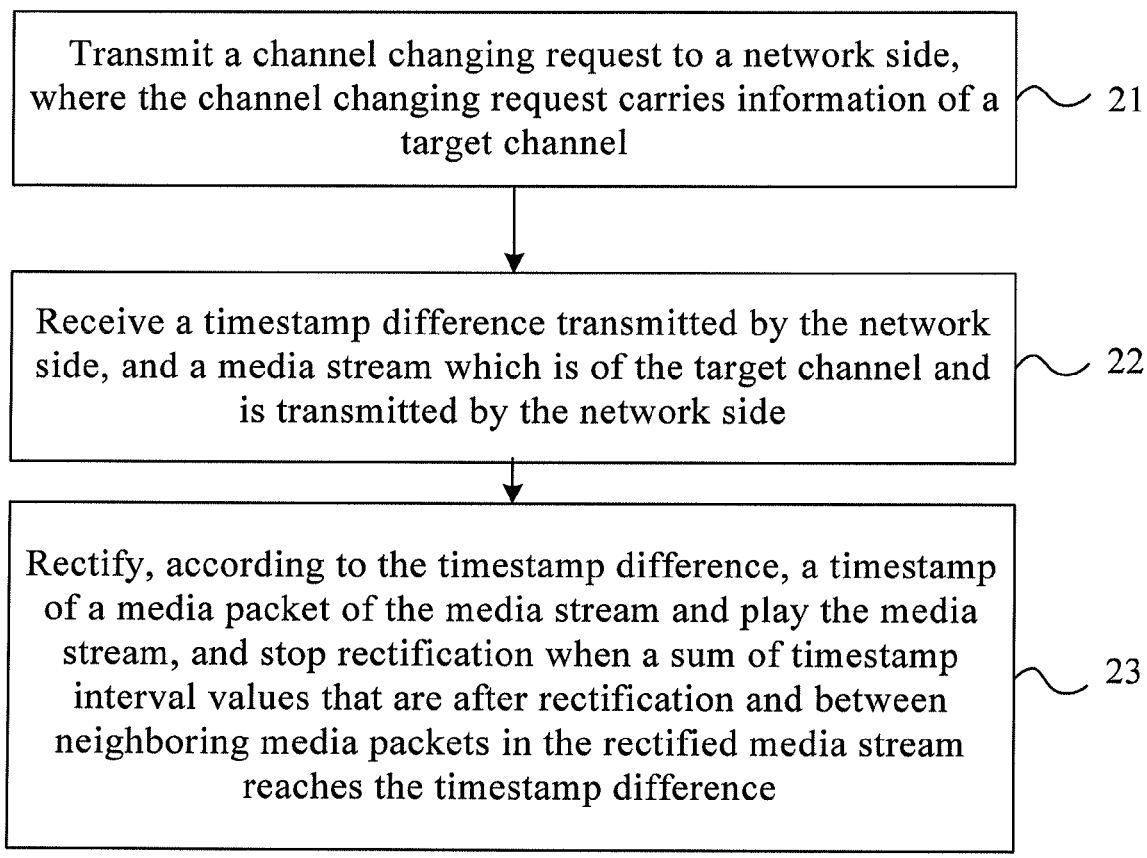
FIG. 2 is a flowchart of another channel changing method according to an embodiment of the present disclosure.

FIG. 2 is a flowchart of another channel changing method according to an embodiment of the present disclosure. The execution body in this embodiment is a terminal. For content about a network side, reference may be made to the description of the embodiment corresponding to FIG. 1. As shown in FIG. 2, this embodiment includes:

Step 21: Transmit a channel changing request to the network side, where the channel changing request carries information of a target channel.

The terminal is a device (a playing device) for a user to watch IPTV and a device (for example, a set-top box) initiating the channel changing request. The channel changing request of the user may be triggered by the user operating a remote controller or other software, and so on. The network side buffers a real-time multicast IPTV media stream. A device having a routing function, such as a home gateway, an access network device, and a convergence network device, may be between the terminal and the network side.

Step 22: Receive a timestamp difference transmitted by the network side, and a media stream of the target channel that is transmitted by the network side.

The media stream of the target channel includes a burst media stream which is of the target channel and is transmitted by the network side in a unicast manner starting from a key frame, and the multicast media stream which is transmitted by the network side after the terminal joins in the multicast group corresponding to the target channel.

The key frame is a key frame which is the last to enter a buffer on the network side before a channel changing request moment. A first media packet of the burst media stream is a multicast media packet in which the key frame is located. When a media packet of the burst media stream unicasted currently to the terminal is the same as a first multicast media packet received by the terminal, the network side stops unicasting the burst media stream to the terminal.

The timestamp difference is used for the terminal to rectify a timestamp of a media packet of which is received after the channel changing request moment. The timestamp difference reflects how much a playing time point of the burst media stream on the terminal that has undergone channel changing is later than a playing time point on a terminal that has not undergone channel changing, that is, a delay in playing the multicast media stream by the terminal.

In a case where there is no unicast interaction signaling, a timestamp difference carried in the first media packet of the burst media stream is received. In a case where there is unicast interaction signaling, a timestamp difference carried in a channel changing response message is received.

When audio data and video data are in different media streams, in the case where there is no unicast interaction signaling, the terminal receives an audio timestamp difference and a video timestamp difference through a first audio media packet of a burst audio stream and a first video media packet of a burst video stream, respectively. When the audio data and the video data are in different media streams, in the case where there is unicast interaction signaling, the terminal receives the audio timestamp difference and the video timestamp difference through the channel changing response message.

Step 23: Rectify, according to the timestamp difference, a timestamp of a media packet of the received media stream and play the media stream, and stop rectification when the sum of timestamp interval values that are after rectification and between neighboring media packets in the rectified media stream reaches the timestamp difference.

The terminal rectifies, in order, timestamps of media packets transmitted to the decoding apparatus, to increase a rate at which the terminal plays the media stream. When the sum of the rectified timestamp interval values (the difference between rectified timestamps of two neighboring media packets) reaches the timestamp difference transmitted by the network side, it indicates that content which is of the target channel and is currently played by the terminal has been synchronized with content which is of the target channel and is played by the terminal that has not undergone channel changing, and rectification of the timestamp of the media packet of the received media stream is stopped. The rectified media stream includes the burst media stream unicasted by the network side, and may also include the multicast media stream received from a multicast device.

When the audio data and the video data are in different media streams, the terminal rectifies a timestamp of an audio media packet in a received audio stream and a timestamp of a video media packet in a received video stream according to the audio timestamp difference and the video timestamp difference respectively, so as to implements synchronization of audio and video.

Specifically, according to the audio timestamp difference, the timestamp of the audio media packet of the audio stream which is received after the channel changing request is transmitted is rectified and playing is performed. In the rectified audio stream, when a sum of rectified audio timestamp interval values between neighboring audio media packets reaches the audio timestamp difference, timestamp rectification is stopped. According to the video timestamp difference, the timestamp of the video media packet of the video stream which is received after the channel changing request is transmitted is rectified and playing is performed. In the rectified video stream, when a sum of rectified video timestamp interval values between neighboring video media packets reaches the video timestamp difference, timestamp rectification is stopped.

In this embodiment, after transmitting the channel changing request to the network side of an IPTV system, the terminal receives the burst media stream which is of the target channel and is transmitted by the network side in the unicast manner starting from the key frame which is the last to enter the buffer before the channel changing request moment, and after the terminal joins in the multicast group, receives the multicast media stream transmitted by the network side. In addition, the terminal also receives the timestamp difference from the network side, and rectifies timestamps of media packets of the burst media stream and the multicast media stream which is received from a multicast source, so as to increase the rate at which the terminal plays the media stream, and reduce the delay in playing the multicast media stream by the terminal that has undergone channel changing, so that the terminal that has undergone channel changing plays the multicast media stream synchronously with the terminal that has not undergone channel changing. In this embodiment, the rectification of the timestamp does not involve a decoding module, where modification to the terminal and the network side device is less.

Figure 3:
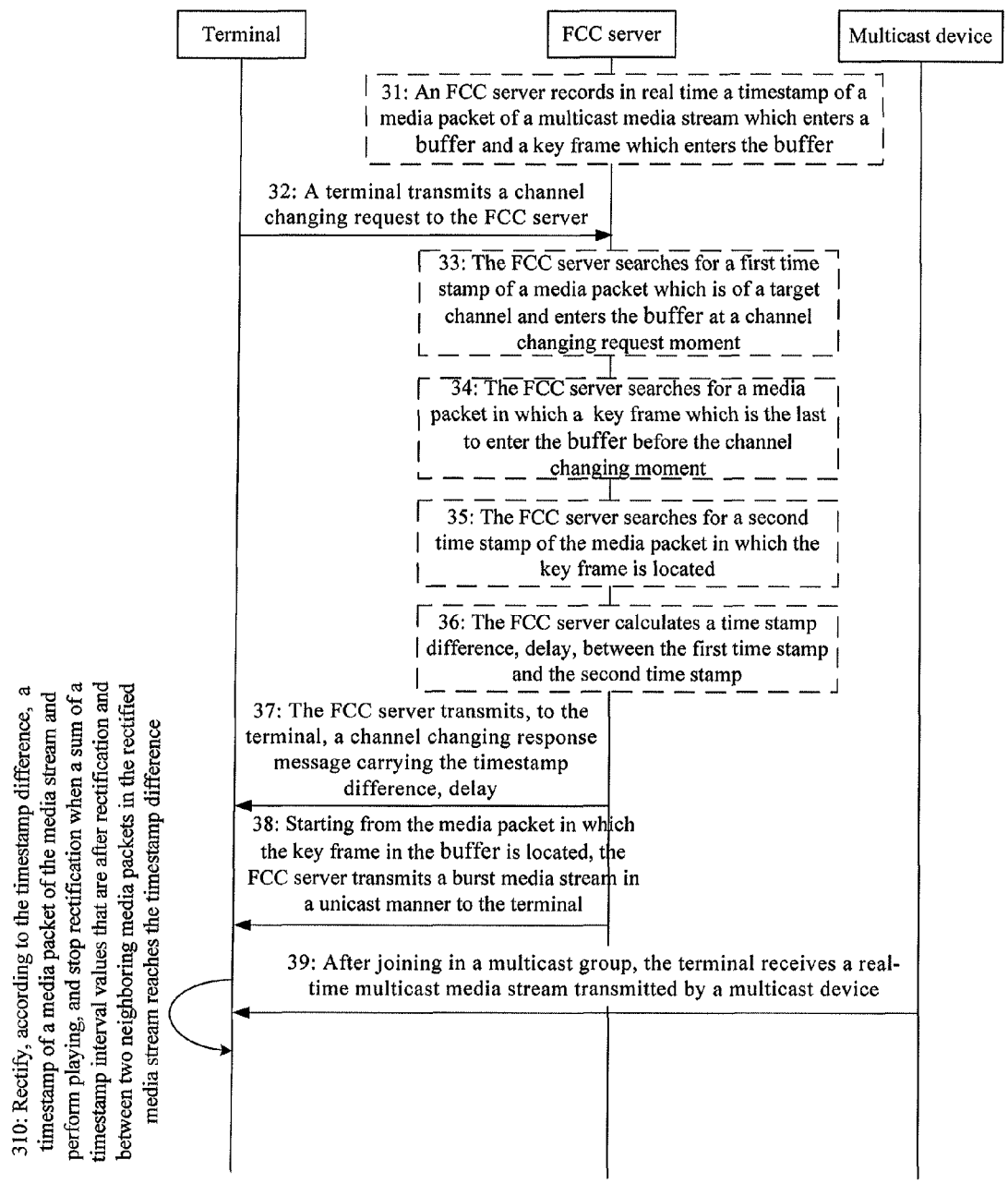
FIG. 3 is a flowchart of another channel changing method according to an embodiment of the present disclosure.

FIG. 3 is a flowchart of another channel changing method according to an embodiment of the present disclosure. This embodiment illustrates the channel changing method in the embodiment of the present disclosure from aspects of a network side device (including an FCC server and a multicast device) and a terminal (including a playing device and a set-top box). This embodiment is applicable to a scenario where the terminal performs a fast channel change in a case where there is unicast interaction signaling. As shown in FIG. 3, this embodiment includes:

Step 31: An FCC server records in real time a timestamp of a media packet of a multicast media stream which enters a buffer, and a key frame which enters the buffer.

A bearing format of a media stream may be RTP, and may also be TS. A field that stores a timestamp in an RTP packet is timestamp, while a field that stores the timestamp in a TS packet is PTS. When the multicast media stream enters the buffer, the FCC server records in real time a timestamp value of an RTP packet which enters the buffer, or records in real time a PTS value of a TS packet which enters the buffer.

Step 32: A terminal transmits a channel changing request to a network side, where the channel changing request carries information of a target channel.

In the case where there is unicast interaction signaling, the terminal transmits the channel changing request to the FCC server during channel changing.

Step 33: The FCC server searches for a first timestamp of the media packet which is of the target channel and enters the buffer at a channel changing request moment.

For an RTP packet, the timestamp of the media packet which is of a target channel and enters the buffer at the channel changing request moment, is a value of a timestamp field (the first timestamp), and is recorded as timestamp_n. For a TS packet, the timestamp of the media packet which of the target channel and enters the buffer at the channel changing request moment, is a value of a pts field (the first timestamp), and recorded as pts_n.

Step 34: The FCC server searches for a media packet in which a key frame which is the last to enter the buffer before the channel changing moment is located.

After a signaling that the terminal requests channel changing has been detected, the key frame which is the last to enter the buffer is searched for, and then the media packet in which the key frame is located is determined. For a media stream coded using the MPEG2 standard, the key frame is an I frame; and for a media stream coded using the H.264 standard, the key frame is an instantaneous decoder refresh (Instantaneous Decoder Refresh, IDR) frame.

Step 35: The FCC server searches for a second timestamp of the media packet in which the key frame in the buffer is located.

For an RTP packet, the timestamp of the media packet in which the key frame is located is a value of a timestamp field (the second timestamp), and recorded as timestamp_i; and for a TS packet, the timestamp of the media packet in which the key frame is located is a value of a pts field (the second timestamp), and recorded as pts_i. The timestamp of the media packet in which the key frame is located may represent a playing time point of a burst media stream to be transmitted in a unicast manner by the FCC server to the terminal.

Step 36: The FCC server calculates a timestamp difference, delay, between the first timestamp and the second timestamp.

For RTP packets, delay=timestamp_$n$–timestamp_$i$;
and for TS packets, delay=pts_$n$–pts_$i$.

The media packet in which the key frame is located is buffered in the FCC server. Therefore, the timestamp (the second timestamp) of the media packet in which the key frame is located is smaller than the timestamp (the first timestamp) of the media packet which enters the buffer of the FCC server at the channel changing moment. The timestamp difference, delay, is obtained by subtracting the second timestamp from the first timestamp, and reflects how much is the playing time point of the burst media stream on the terminal is later than a playing time point on a terminal that has not undergone channel changing.

Step 37: The FCC server transmits, to the terminal, a channel changing response message carrying the timestamp difference, delay.

If audio data and video data are in a same RTP stream, the channel changing response message carries only one difference: the timestamp difference, delay. If the audio data and the video data are in different RTP streams, the channel changing response message carries multiple audio timestamp differences and video timestamp differences.

Step 38: Starting from the media packet in which the key frame in the cache is located, the FCC server transmits the burst media stream in the unicast manner to the terminal.

Step 39: After joining in a multicast group, the terminal receives a real-time multicast media stream transmitted by a multicast device.

The terminal first receives the burst media stream transmitted by the FCC server, and after joining in the multicast group corresponding to the target channel, receives the multicast media stream.

Step 310: The terminal rectifies, according to the timestamp difference, delay, the timestamp of the received media packet and performs playing, and stops rectification when a sum of timestamp interval values that are after rectification and between neighboring media packets of the rectified media stream reaches the timestamp difference, delay.

When the audio data and the video data are in different media streams, that is, an audio stream (there may be multiple audio streams) and a video stream are transported separately, in step 31, an audio timestamp of each multicast audio packet that enters the buffer and a video timestamp of each multicast video packet are recorded in real time. In step 33, when the first timestamp is searched for, a first audio timestamp of each audio packet that enters the buffer at the channel changing request moment, and a first video timestamp of each video packet that enters the buffer at the channel changing request moment need to be searched for. In step 34, when the key frame is searched for, the key frame which is the last to enter the buffer at the channel changing moment and is in each multicast video stream is searched for. In step 35, when the second timestamp is searched for, a second audio timestamp of each last audio packet that enters the buffer before the channel changing request moment, and a second video timestamp of the video packet in which the key frame which is the last to enter the buffer before the channel changing request moment is located need to be searched for.

In step 36, when the timestamp difference is calculated, an and io timestamp difference of each audio stream and a video timestamp difference of each video stream are calculated. In step 37, when the channel changing response message is transmitted, the channel changing response message carries the audio timestamp difference of each audio stream and the video timestamp difference of each video stream. In step 38, each burst audio stream and burst video stream are transmitted to the terminal in the unicast manner. In step 310, the terminal rectifies, according to each received audio timestamp difference, a timestamp of an audio packet in a corresponding audio stream; and rectifies, according to each received video timestamp difference, a timestamp of a video packet in a corresponding video stream, so that synchronized rectification and playing of audio and video is implemented.

A specific method for the terminal to rectify the timestamp of the media stream may be as follows:

For a first media packet (that is, a first burst media packet of the burst media stream) in the media stream which is received after the channel changing request is transmitted: rectifying a timestamp of the first media packet according to the timestamp difference, to obtain a rectified timestamp of the first media packet.

An RTP packet bearing the media stream is taken for example, where a formula for rectifying a timestamp of a first RTP packet may be: rectified timestamp value of the first RTP packet=timestamp value of the first RTP packet+timestamp difference delay.

For other media packets, except the first media packet, in the media stream which is received after the channel changing request is transmitted: according to a rectified timestamp of a previous media packet of a current media packet under rectification, a timestamp of the current media packet under rectification, and a preset timestamp interval value after rectification, rectifying the timestamp of the current media packet under rectification, and performing playing; and stopping rectification when the sum of the timestamp interval values that are after rectification and between neighboring media packet in the rectified media stream reaches the timestamp difference.

The timestamp interval value after rectification is a preset value which may be preset by the network and then transmitted to the terminal, and may also be preset on the terminal. The timestamp interval value after rectification is related to a terminal user's experience in watching played content, and better to be neither too large nor too small. A too small interval may increase a delay in playing a real-time media stream and a too large interval may produce a poor user experience because the content is played too quickly.

The RTP packet bearing the media stream is taken for example, where a formula for rectifying timestamps of the other RTP packets except the first RTP packet may be: rectified timestamp value of the current RTP packet being rectified=(timestamp value of the current RTP packet being rectified−timestamp of the previous RTP packet)×proportion to which the timestamp value interval is reduced+the rectified timestamp of the previous RTP packet.

Proportion to which the timestamp value interval is reduced=preset timestamp interval value after rectification/ timestamp interval value before rectification. Timestamp interval value before rectification=timestamp value of the current RTP packet under rectification−timestamp value of the previous RTP packet, and timestamp interval value after rectification=rectified timestamp value of the RTP packet under rectification−rectified timestamp value of the previous RTP packet.

When the timestamp of the media packet is rectified, an accumulated sum T of a differences that are after rectification and between neighboring media packets is calculated. The RTP packet bearing the media stream is taken for example, where T=Σ (timestamp of the current RTP packet under rectification−timestamp of the previous RTP packet)×proportion to which the timestamp interval value is reduce. When the accumulated sum T reaches the timestamp difference, delay, transmitted by the network side, rectification of the received RTP packet is stopped.

For example, the burst media stream is 10 packets later than the multicast media stream. Due to the 10 packets, the playing time point of the burst media stream on the terminal is later than the playing time point on the terminal that has not undergone channel changing. Each 3600 timestamps correspond to a packet playing time. The timestamp difference, delay, transmitted by the network side is 36000, original packets 1, 2. 3, 4 . . . correspond to timestamps 3600, 7200, 10800, 14400 . . . ; and packets after rectification 1, 2, 3, 4 . . . correspond to the timestamps 39600, 41400, 43200, 45000 . . . Table 1 shows a comparison between the original timestamps of the packets and the timestamps after rectification.

Each time a packet is rectified, the timestamp difference between neighboring packets is 1800. After 20 packets are played, the accumulated sum T of timestamp differences after rectification reaches the timestamp difference 36000 transmitted by the network side, timestamp rectification of the packet is stopped. After the terminal rectifies the received media stream, an achieved effect is that within a time period in which the terminal that has undergone channel changing plays 20 packets, the terminal that has not undergone channel changing plays 10 packets. That is, within a same period of time, played content is twice of originally played content and a playing rate is twice a original playing rate. In this way, the terminal that has undergone channel changing plays the real-time media stream synchronously with the terminal that has not undergone channel changing.

In addition, as shown in Table 1, there may be multiple packets for data of each frame. This batch of packets has a same timestamp. One RTP packet or TS packet above may correspond to one batch of packets in practical application.

TABLE 1

Comparison between original timestamp of packets and timestamp of the packets after rectification

| Packet Sequence | Homing Frame by Presentation Sequence | Original Timestamp of Packet | Timestamp after Rectification |
| --- | --- | --- | --- |
| 1 | I | 3600 | 39600 |
| 2 | I | 3600 | 39600 |
| 3 | I | 3600 | 39600 |
| 4 | I | 3600 | 39600 |
| 5 | I | 3600 | 39600 |
| 6 | I | 3600 | 39600 |
| 7 | I | 3600 | 39600 |
| 8 | B1 | 7200 | 41400 |
| 9 | B1 | 7200 | 41400 |
| 10 | B1 | 7200 | 41400 |
| 11 | P1 | 10800 | 43200 |
| 12 | P1 | 10800 | 43200 |
| 13 | P1 | 10800 | 43200 |
| 14 | B2 | 14400 | 45000 |
| 15 | B2 | 14400 | 45000 |
| 16 | P2 | 18000 | 46800 |
| 17 | P2 | 18000 | 46800 |
| 18 | P2 | 18000 | 46800 |
| 19 | P2 | 18000 | 46800 |

Further, because a P frame is a frame coded according to the difference of a previous frame, and a B frame is a frame coded according to the differences of a previous frame and a next frame, the P frame is decoded before the B frame and the B frame is presented before the P frame. To be specific, a presentation sequence of the B frame and the P frame is reverse to a decoding sequence of the B frame and the P frame. In a packet, transport is performed usually according to the decoding sequence as a transport sequence. As shown in Table 2, the timestamp of the P frame is later than that of the B frame, but the P frame is transported and decoded before the B frame.

TABLE 2

Timestamps of packets before and after rectification sorted in a transport sequence

| Packet Sequence | Homing Frame by Transport Sequence | Original Timestamp of Packet | Timestamp after Rectification |
| --- | --- | --- | --- |
| 1 | I | 3600 | 39600 |
| 2 | I | 3600 | 39600 |
| 3 | I | 3600 | 39600 |
| 4 | I | 3600 | 39600 |
| 5 | I | 3600 | 39600 |
| 6 | I | 3600 | 39600 |
| 7 | I | 3600 | 39600 |
| 8 | P1 | 10800 | 43200 |
| 9 | P1 | 10800 | 43200 |
| 10 | P1 | 10800 | 43200 |
| 11 | B1 | 7200 | 41400 |
| 12 | B1 | 7200 | 41400 |
| 13 | B1 | 7200 | 41400 |
| 14 | P2 | 18000 | 46800 |
| 15 | P2 | 18000 | 46800 |
| 16 | P2 | 18000 | 46800 |
| 17 | P2 | 18000 | 46800 |
| 18 | B2 | 14400 | 45000 |
| 19 | B2 | 14400 | 45000 |

In this embodiment, in a case where there is no unicast interaction signaling, the terminal transmits the channel changing request to the FCC server. After determining a timestamp difference between the burst media stream and the real-time multicast media stream, the FCC server transmits the timestamp difference to the terminal through the channel changing response message, and then unicasts the burst media stream to the terminal. After receiving the timestamp difference, the terminal rectifies, according to the timestamp difference, the timestamp of the media packet of the received media stream and stops timestamp rectification when the sum of the timestamp interval values that are after rectification and between neighboring media packets reaches the timestamp difference. In this way, within a same period of time, the terminal that has undergone channel changing plays more media streams than the terminal that has not undergone channel changing. Therefore, the delay in playing the multicast media stream by the terminal with channel changing is reduced, so that the terminal that has undergone channel changing plays the multicast media stream synchronously with the terminal that has not undergone channel changing.

Figure 4:
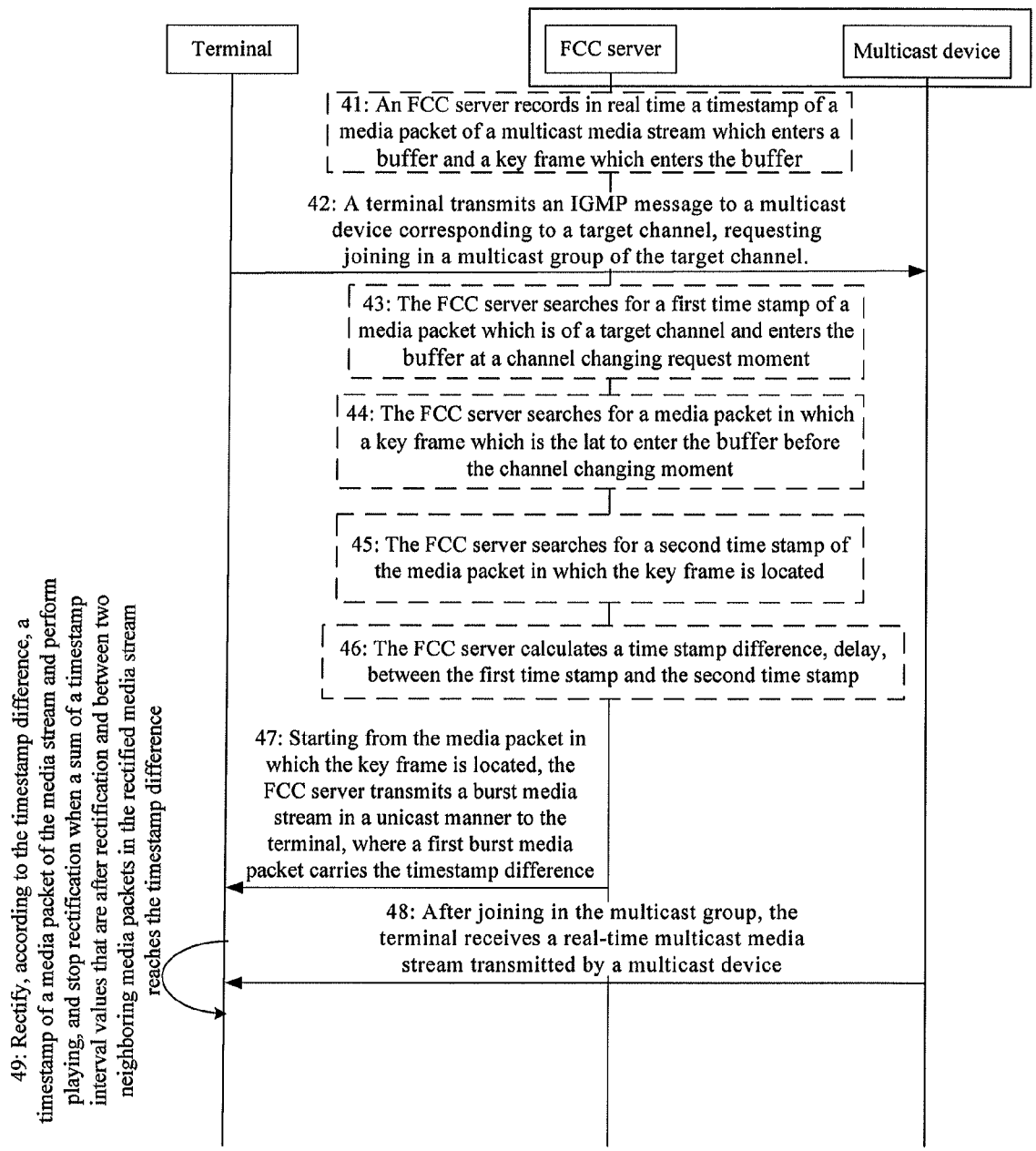
FIG. 4 is a flowchart of another channel changing method according to an embodiment of the present disclosure.

FIG. 4 is a flowchart of another channel changing method according to an embodiment of the present disclosure. This embodiment differs from the embodiment corresponding to FIG. 3 in that this embodiment is applicable to a scenario where a terminal performs fast channel change in a case where there is no unicast interaction signaling. As shown in FIG. 4, this embodiment includes:

Step 41: An FCC server records in real time a timestamp of a media packet of a multicast media stream which enters a buffer and a key frame which enters the buffer.

Step 42: A terminal transmits an IGMP message to a multicast device corresponding to a target channel, and requests joining in a multicast group of the target channel.

In the case where there is no unicast interaction signaling, during channel changing, the terminal directly transmits the Internet Group Management Protocol (Internet Group Management Protocol, IGMP for short) message to the multicast device to join in the multicast group.

Step 43: The FCC server searches for a first timestamp of a media packet which is of the target channel and enters the buffer at a channel changing request moment.

In network architecture in this scenario, after the terminal transmits a request for joining in the multicast group to the multicast device, the FCC server can timely acquire the request transmitted by the terminal, and for details, reference may be made to the prior art. After acquiring the request of the terminal for joining in the multicast group, the FCC server searches for the first timestamp of a multicast stream of the target channel, where the multicast stream of the target channel enters the buffer at the channel changing request moment.

Step 44: The FCC server searches for a media packet in which a key frame which is the last to enter the buffer before the channel changing request moment is located.

Step 45: The FCC server searches for a second timestamp of the media packet in which the key frame in the buffer is located.

Step 46: The FCC server calculates a timestamp difference, delay, between the first timestamp and the second timestamp.

Step 47: Starting from the media packet in which the key frame in the buffer is located, the FCC server transmits a burst media stream in a unicast manner to the terminal, where a first burst media packet carries the timestamp difference.

An RTP packet bearing the media stream is taken for example, where when the FCC server unicasts the burst media stream to the terminal, an extension field of the first RTP packet carries the timestamp difference. A TS packet bearing the media stream is taken for example, where a first TS header carries the timestamp difference. A DTS value exists but a PTS value does not exist and is an invalid value. Therefore, PTS_DTS_flag in a first PES packet is set to 1. PTS_DTS_flag being 1 does not affect normal playing of the packet.

Step 48: After joining into the multicast group, the terminal receives a real-time multicast media stream transmitted by the multicast device.

Step 49: The terminal rectifies, according to the timestamp difference, delay, a timestamp of a media packet of the received media stream of the target channel, plays the media stream according to the timestamp after rectification, and stops timestamp rectification when a sum of timestamp interval values that are after rectification and between neighboring media packets of the rectified media stream reaches the timestamp difference, delay.

For a specific rectification process, reference may be made to the description of the embodiment corresponding to FIG. 3.

In this embodiment, in the case where there is no unicast interaction signaling, when channel changing needs to be performed, the terminal directly transmits the request for joining in the multicast group to the multicast device corresponding to the target channel. After the channel changing request of the terminal has been detected, the FCC server determines a timestamp difference between the burst media stream and the multicast media stream. The timestamp difference reflects a delay in playing the multicast media stream by the terminal. When the burst media stream is unicasted to the terminal, the timestamp difference is carried in a first burst media stream and transmitted to the terminal. After receiving the timestamp difference, the terminal rectifies the received media stream according to the timestamp difference, and stops rectification when a sum of differences between timestamps of neighboring media streams after rectification reaches the timestamp difference. In this way, the delay in playing the multicast media stream by the terminal that has undergone channel changing is reduced, and the terminal that has undergone channel changing plays the multicast media stream synchronously with a terminal that has not undergone channel changing.

Figure 5:
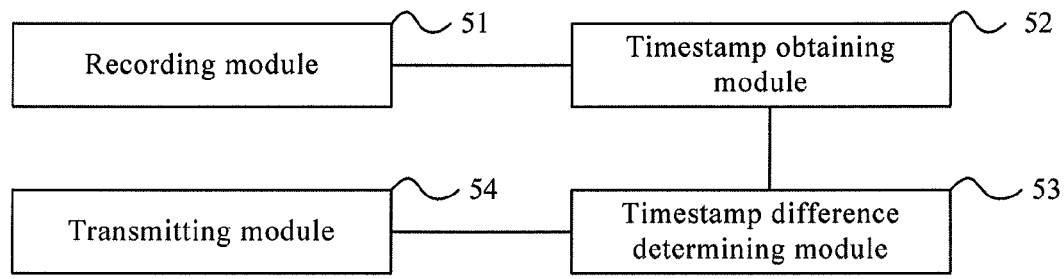
FIG. 5 is a schematic structural diagram of a channel changing apparatus according to an embodiment of the present disclosure.

FIG. 5 is a schematic structural diagram of a channel changing apparatus according to an embodiment of the present disclosure. As shown in FIG. 5, this embodiment includes: a recording module 51, a timestamp obtaining module 52, a timestamp difference determining module 53, and a transmitting module 54.

The recording module 51 is configured to record in real time a timestamp of a media packet of a multicast media stream which enters a buffer, and a key frame which enters the buffer.

The timestamp obtaining module 52 is configured to, when a channel changing request transmitted by a terminal has been detected, obtain, according to the recorded timestamp, a first timestamp of a media packet which is of a target channel and enters the buffer at a channel changing request moment, and a second timestamp of a media packet in which a key frame which is of the target channel and is the last to enter the buffer before the channel changing request moment is located.

The timestamp difference determining module 53 is configured to determine a timestamp difference between the first timestamp and the timestamp.

The transmitting module 54 is configured to transmit the timestamp difference to the terminal and starting from the key frame, transmit, in a unicast manner, a burst media stream of the target channel in the buffer to the terminal; where the timestamp difference is used for the terminal to rectify a timestamp of a media packet of a media stream which is received after the channel changing request moment, and the media stream which is received after the channel changing request moment includes the burst media stream.

Specifically, the recording module 51 records in real time the timestamp of the media packet in the multicast media stream which enters a buffer and the key frame which enters the buffer. The timestamp obtaining module 52, when the channel changing request transmitted by a terminal has been detected, obtains, according to the timestamp recorded by the recording module 51 in real time, the first timestamp of the media packet which is of the target channel and enters the buffer at the channel changing request moment, and the second timestamp of the media packet in which the key frame which is of the target channel and is the last to enter the buffer before the channel changing request moment is located. The timestamp difference determining module 53 determines the timestamp difference between the first timestamp and the second timestamp which are obtained by the timestamp obtaining module 52. The transmitting module 54 transmits, to the terminal, the timestamp difference determined by the timestamp difference determining module 53, and transmits, in the unicast manner, the burst media stream of the target channel to the terminal.

Figure 6:
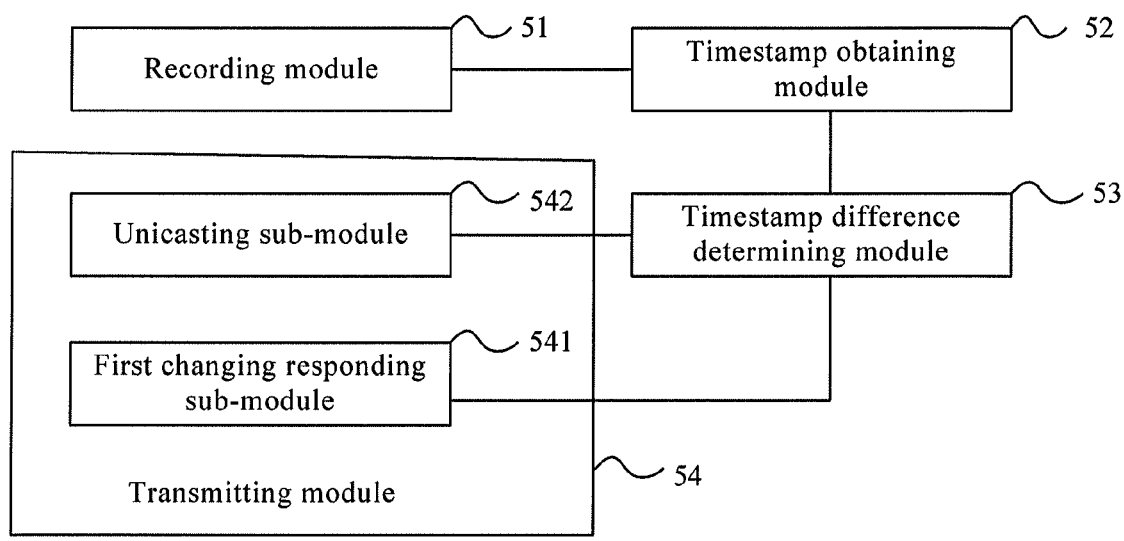
FIG. 6 is a schematic structural diagram of another channel changing apparatus according to an embodiment of the present disclosure.

As shown in FIG. 6, the transmitting module 54 includes: a first changing responding sub-module 541 and a unicasting sub-module 542.

The unicasting sub-module 542 is configured to transmit, in the unicast manner, the burst media stream of the target channel to the terminal, and carry a timestamp difference in a first media packet of the burst media stream and transmit the media packet to the terminal.

In a case where there is no unicast interaction signaling, the unicasting sub-module 542 transmits, in the unicast manner, the burst media stream of the target channel to the terminal. When a first burst media packet is transmitted in the unicast manner to the terminal, the first burst media packet carries the timestamp difference determined by the timestamp difference determining module 53.

The first changing responding sub-module 541 is configured to transmit, to the terminal, a channel changing response message carrying the timestamp difference. The unicasting sub-module 542 is configured to transmit, in the unicast manner, a burst media stream of the target channel to the terminal.

In a case where there is unicast interaction signaling, the first changing responding sub-module 541 transmits, to the terminal, the channel changing response message carrying the timestamp difference which is determined by the timestamp difference determining module 53. The unicasting sub-module 542 transmits, in the unicast manner, the burst media stream of the target channel to the terminal.

For the working mechanism of each module in this embodiment, reference may be made to the description of the embodiment corresponding FIG. 1, and the details are not repeated here.

In this embodiment, the recording module 51 records in real time a timestamp of the media packet that is of each target channel and is the latest to enter the buffer, and the key frame which enters the buffer. In this way, at the moment when the channel changing request of the terminal is received, the timestamp difference determining module 53 determines a timestamp difference between a timestamp of a media packet that is of the target channel and is the latest to enter the buffer and the timestamp of the media packet in which a key frame that is closest to a channel changing moment and is in the buffer is located. The transmitting module 54 transmits a burst media stream to the terminal in the unicast manner, and transmits the timestamp difference to the terminal, so that before playing the media stream which is received after the channel changing request moment, the terminal rectifies the timestamp of the media packet in the media stream according to the timestamp difference. In this way, within a same period of time, the terminal plays more media streams than the terminal that has not undergone channel changing. Therefore, in this embodiment, a delay in playing the multicast media stream by the terminal is reduced, so that the terminal that has undergone channel changing plays the multicast media stream synchronously with the terminal that has not undergone channel changing.

Figure 7:
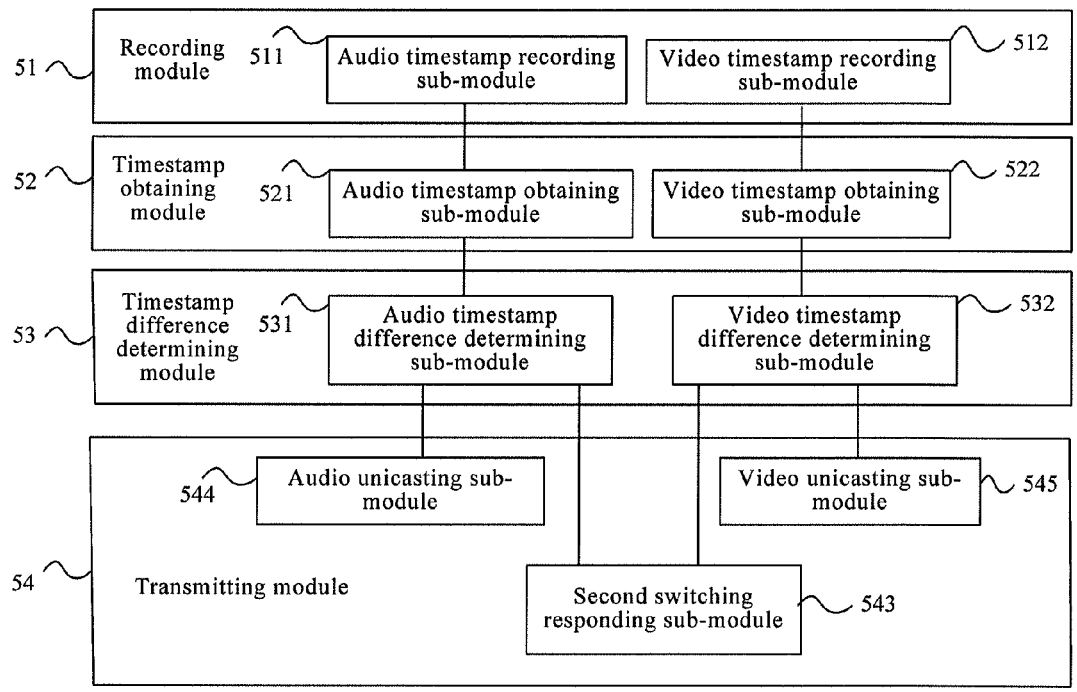
FIG. 7 is a schematic structural diagram of another channel changing apparatus according to an embodiment of the present disclosure.

FIG. 7 is a schematic structural diagram of another channel changing apparatus according to an embodiment of the present disclosure. The channel changing apparatus in this embodiment is applicable to a scenario where audio data and video data are transported in different media streams.

As shown in FIG. 7, a recording module 51 in FIG. 5 includes: an audio timestamp recording sub-module 511 and a video timestamp recording sub-module 512.

The audio timestamp recording sub-module 511 is configured to record in real time an audio timestamp of an audio media packet which enters a buffer. The video timestamp recording sub-module 512 is configured to record in real time a video timestamp of a video media packet which enters the buffer.

As shown in FIG. 7, a timestamp obtaining module 52 in FIG. 5 includes: an audio timestamp obtaining sub-module 521 and a video timestamp obtaining sub-module 522.

The audio timestamp obtaining sub-module 521 is configured to obtain a first audio timestamp of an audio media packet of a target channel, where the audio media packet of the target channel enters the buffer at a channel changing request moment, and a second audio timestamp of an audio media packet which is the last to enter the buffer before the channel changing request moment.

The video timestamp obtaining sub-module 522 is configured to obtain a first video timestamp of a video media packet of the target channel, where the video media packet of the target channel enters the buffer of a target channel at the channel changing request moment, and a second video timestamp of a video media packet in which a key frame which is the last to enter the buffer before the channel changing request moment is located.

A timestamp difference determining module 53 includes: an audio timestamp difference determining sub-module 531 and a video timestamp difference determining sub-module 532.

The audio timestamp difference determining sub-module 531 is configured to determine an audio timestamp difference between the first audio timestamp and the second audio timestamp.

The video timestamp difference determining sub-module 532 is configured to determine a video timestamp difference between the first video timestamp and the second video timestamp.

As shown in FIG. 7, a transmitting module in FIG. 5 includes: a second changing responding sub-module 543, an audio unicasting sub-module 544, and a video unicasting sub-module 545.

The second changing responding sub-module 543 is configured to transmit, to a terminal, a channel changing response message carrying the audio timestamp difference and the video timestamp difference.

The audio unicasting sub-module 544 is configured to transmit a burst audio stream in a unicast manner to the terminal, and further configured to carry the audio timestamp difference in a first audio media packet of the burst audio stream and transmit the audio media packet to the terminal.

The video unicasting sub-module 545 is configured to transmit a burst video stream in the unicast manner to the terminal, and further configured to carry the video timestamp difference in a first video media packet of the burst video stream and transmit the video media packet to the terminal.

In the case where there is un icast interaction signaling, the second changing responding sub-module 543 first transmits, to the terminal, a channel changing response message carrying the audio timestamp difference and the video timestamp difference. Then, the audio unicasting sub-module 544 transmits the burst audio stream to the terminal in the unicast manner. The video unicasting sub-module 545 transmits the burst video stream to the terminal in the unicast manner.

For the working mechanism of each module in this embodiment, reference is made to the description of the embodiments corresponding to FIG. 1, FIG. 3, and FIG. 4, and the details are not repeated here.

In this embodiment, the timestamp difference determining module 53 determines the difference between the first audio timestamp and the second audio timestamp which are obtained by the audio timestamp obtaining sub-module 521: the audio timestamp difference; and determine the difference between the first video timestamp and the second video timestamp which are obtained by the video timestamp obtaining sub-module 522: the video timestamp difference. I n the case where there is no unicast interaction signaling, when transmitting the unicast burst audio stream to the terminal, the audio unicasting sub-module 544 carries the audio timestamp difference in the first audio media packet of the burst audio stream and transmits the first audio media packet to the terminal. When unicasting the burst video stream to the terminal, the video unicasting sub-module 545 carries the video timestamp difference in the first video media packet of the burst video stream and transmits the first video media packet to the terminal. In this way, after receiving the audio timestamp difference and the video timestamp difference, the terminal rectifies a timestamp of a received audio stream and a timestamp of a received video stream according to the audio timestamp difference and the video timestamp difference respectively, so that synchronized playing of audio and video is implemented.

Figure 8:
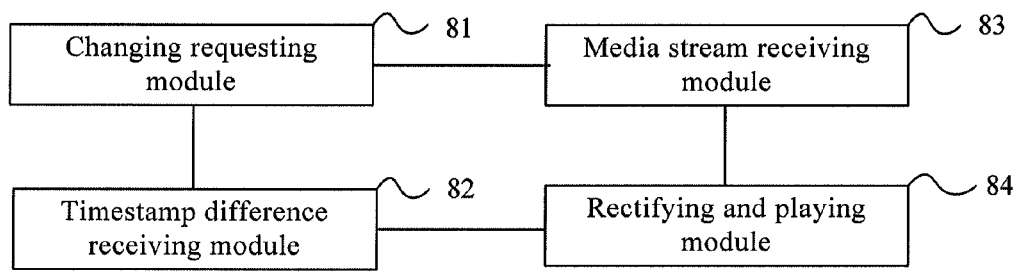
FIG. 8 is a schematic structural diagram of a terminal according to an embodiment of the present disclosure.

FIG. 8 is a schematic structural diagram of a terminal according to an embodiment of the present disclosure. As shown in FIG. 8, this embodiment includes: a changing requesting module 81, a timestamp difference receiving module 82, a media stream receiving module 83, and a rectifying and playing module 84.

The changing requesting module 81 is configured to transmit a channel changing request to a network side, where the channel changing request carries information of a target channel.

The timestamp difference receiving module 82 is configured to receive a timestamp difference transmitted by the network side.

The media stream receiving module 83 is configured to receive a media stream which is of the target channel and is transmitted by the network side; where the media stream of the target channel includes a burst media stream of the target channel, or the burst media stream o f the target channel and a multicast media stream which is transmitted by the network side and is received by the terminal after the terminal joins in a multicast group corresponding to the target channel.

The rectifying and playing module 84 is configured to rectify, according to the timestamp difference, a timestamp of a media packet of the media stream and play the media stream, and stop rectification when a sum of timestamp interval values that are after rectification and between neighboring media packets in the rectified media stream reaches the timestamp difference.

Specifically, after the changing requesting module 81 transmits, to the network side, the channel changing request including the information of the target channel, the timestamp difference receiving module 82 receives the timestamp difference transmitted by the network side. The media stream receiving module 83 receives the media stream transmitted by the network side. The rectifying and playing module 84 rectifies, according to the timestamp difference received by the timestamp difference receiving module 82, the timestamp of the media packet of the media stream which is received by the media stream receiving module 83 after the channel changing request is transmitted, and plays the media stream, and stops timestamp rectification when the sum of the timestamp interval values that are after rectification and between neighboring media packets in the rectified media stream reaches the timestamp difference.

Figure 9:
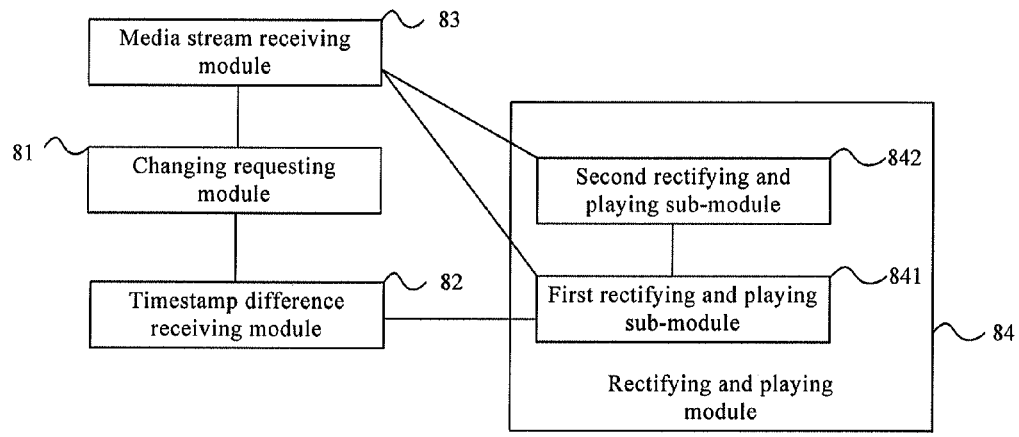
FIG. 9 is a schematic structural diagram of another terminal according to an embodiment of the present disclosure.

As shown in FIG. 9, the rectifying and playing module 84 includes: a first rectifying and playing sub-module 841 and a second rectifying and playing sub-module 842.

The first rectifying and playing sub-module 841 is configured to rectify, according to the timestamp difference, a timestamp of a first media packet in the media stream and performs playing.

The second rectifying and playing sub-module 842 is configured to, according to a rectified timestamp of a previous media packet of a current media packet under rectification, a timestamp of the current media packet under rectification, and a preset timestamp interval value after rectification, rectify the timestamp of the current media packet under rectification and perform playing, and stop rectification when the sum of the timestamp interval values that are after rectification and between neighboring media packets in the rectified media stream reaches the timestamp difference.

Specifically, the first rectifying and playing sub-module 841 rectifies, according to the timestamp difference received by the timestamp receiving module 82, the timestamp of the first media packet received by the media stream receiving module 83 and performs playing. The second rectifying and playing sub-module 842 rectifies, according to the rectified timestamp which is obtained by the first rectifying and playing sub-module 841 rectifying the first media packet, a timestamp of a second media packet received by the media stream receiving module 83 and performs playing. As deduced by analogy, in a case of a subsequent media packet in the media stream, the second rectifying and playing sub-module 842, according to the rectified timestamp of the previous media packet of the current media stream under rectification, the timestamp of the current media packet under rectification, and the preset timestamp interval value after rectification, rectifies the timestamp of the current media packet under rectification and performs playing, and stops rectification when the sum of the timestamp interval values that are after rectification and between neighboring media packets in the rectified media stream reaches the timestamp difference.

For the working mechanism of each module in this embodiment, reference is made to the description of the embodiment corresponding to FIG. 2 or FIG. 3, and the details are not repeated here.

In this embodiment, the first rectifying and playing module 84 rectifies, according to the timestamp difference received by the timestamp receiving module 82, the timestamp of the media packet of the media stream received by the media stream receiving module 83, and performs playing. The timestamp difference reflects an extent to which content of the burst media stream received by the terminal is staler than that of the real-time multicast media stream of the target channel. Therefore, rectifying the timestamp of the received media packet according to the timestamp difference can increase a rate at which the terminal plays the media stream, thereby reducing a delay in playing the multicast media stream by the terminal with channel changing, so that the terminal that has undergone channel changing play the multicast media stream synchronously with a terminal that has not undergone channel changing.

Figure 10:
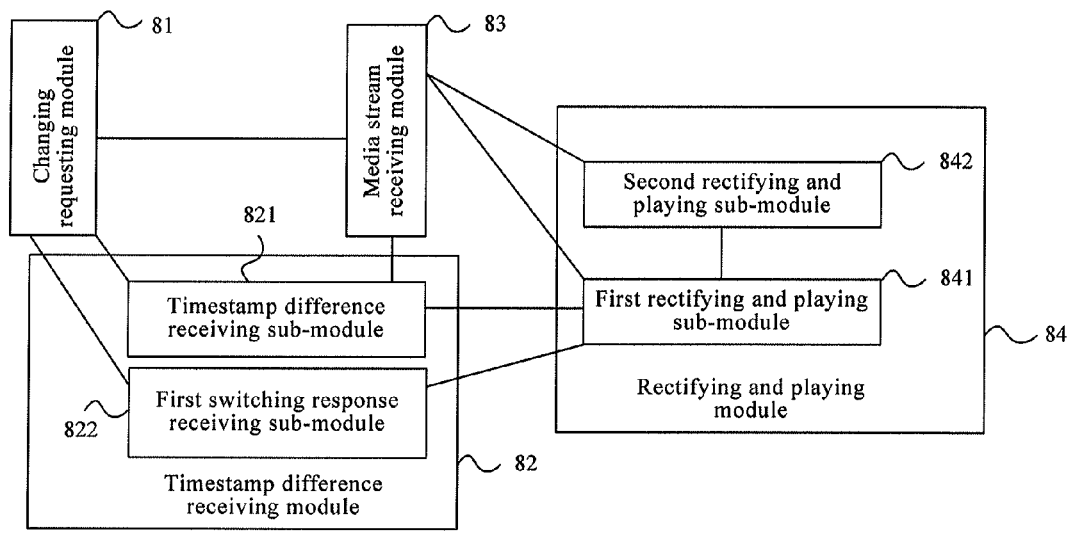
FIG. 10 is a schematic structural diagram of another terminal according to an embodiment of the present disclosure.

FIG. 10 is a schematic structural diagram of another terminal according to an embodiment of the present disclosure. Based on the embodiment corresponding to FIG. 9, as shown in FIG. 10, a timestamp difference receiving module 82 includes: a timestamp difference receiving sub-module 821 and a first changing response receiving sub-module 822.

The timestamp difference receiving sub-module 821 is configured to receive, through a first media packet of a burst media stream, a timestamp difference transmitted by a network side.

The first changing response receiving sub-module 822 is configured to receive a channel changing response message which carries the timestamp difference and is transmitted by the network side.

In a case where there is no unicast interaction signaling, after the terminal transmits a channel changing request to the network side, the timestamp difference receiving module 821 receives the timestamp difference through the first media packet in the burst media stream transmitted by the media stream receiving module 83. In a case where there is unicast interaction signaling, after the terminal transmits the channel changing request to the network side, the first changing response receiving sub-module 822 receives the timestamp difference through the channel changing response message transmitted by the network side.

In this embodiment, in the case where there is no unicast interaction signaling, the timestamp difference which is used for rectifying the media packet of the media stream and transmitted by the network side is received through the first media packet of the media stream transmitted by a media stream receiving module 83. In the case where there is unicast interaction signaling, the first changing response receiving sub-module 822 receives the timestamp difference transmitted by the network side. Therefore, this embodiment is applicable to a scenario where there is no unicast interaction signaling, is also applicable to a scenario where there is unicast interaction signaling, and is not limited by an application scenario.

Figure 11:
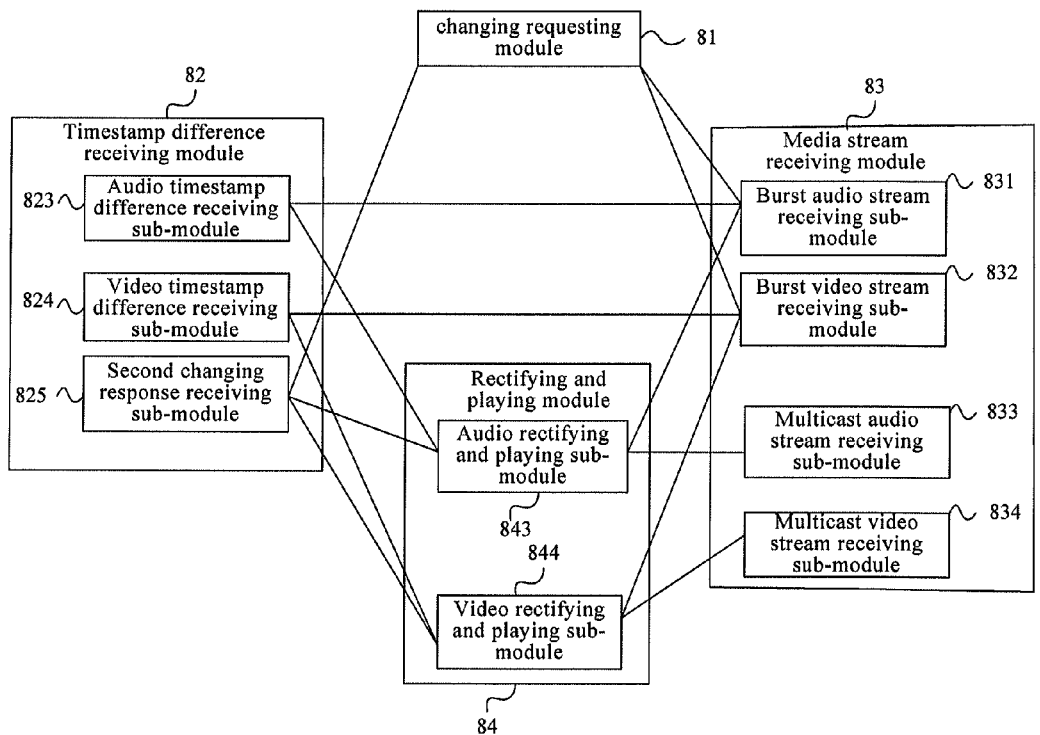
FIG. 11 is a schematic structural diagram of another terminal according to an embodiment of the present disclosure.

FIG. 11 is a schematic structural diagram of another terminal according to an embodiment of the present disclosure. This embodiment is applicable to a scenario where audio data and video data are transmitted in different media streams. This embodiment describes a specific implementation manner of the embodiment corresponding to FIG. 8, and this embodiment specifically is:

A timestamp difference receiving module 82 includes: an audio timestamp difference receiving sub-module 823, a video timestamp difference receiving sub-module 824, and a second changing response receiving sub-module 825.

The audio timestamp difference receiving sub-module 823 is configured to receive, through a first audio media packet of a burst audio stream, an audio timestamp difference transmitted by a network side.

The video timestamp difference receiving sub-module 824 is configured to receive, through a first video media packet of a burst video stream, a video timestamp difference transmitted by the network side.

The second changing response receiving sub-module 825 is configured to receive a channel changing response message which carries the audio timestamp difference and the video timestamp difference and is transmitted by the network side.

A media stream receiving module 83 includes: a burst audio stream receiving sub-module 831, a burst video stream receiving sub-module 832, a multicast audio stream receiving sub-module 833, and a multicast video stream receiving sub-module 834.

The burst audio stream receiving sub-module 831 is configured to receive a burst audio stream unicasted by the network side.

The burst video stream receiving sub-module 832 is configured to receive a burst video stream unicasted by the network side.

The multicast audio stream receiving sub-module 833 is configured to, after joining in a multicast group corresponding to a target channel, receive a multicast audio stream transmitted by the network side.

The multicast video stream receiving sub-module 834 is configured to, after joining in the multicast group corresponding to the target channel, receive a multicast video stream transmitted by the network side.

Specifically, after the channel changing requesting module 81 transmits a channel changing request to the network side, in a case where there is no unicast interaction signaling, the audio timestamp difference receiving sub-module 823 receives, through the burst audio stream receiving sub-module 831, the audio timestamp difference transmitted by the network side; and the video timestamp difference receiving sub-module receives, through the burst video stream receiving sub-module 832, the video timestamp difference transmitted by the network side; in a case where there is unicast interaction signaling, the second changing response receiving sub-module 825 receives, through the channel changing response message on the network side, the audio timestamp difference and the video timestamp difference which are transmitted by the network side.

A rectifying and playing module 84 includes: an audio rectifying and playing sub-module 843 and a video rectifying and playing sub-module 844.

The audio rectifying and playing sub-module 843 is configured to rectify, according to the audio timestamp difference, a timestamp of an audio media packet in an audio stream which is received after the channel changing request is transmitted, and perform playing, and stop rectification when a sum of audio timestamp interval values that are after rectification and between neighboring audio media packets reaches the audio timestamp difference.

The video rectifying and playing sub-module 844 is configured to rectify, according to the video timestamp difference, a timestamp of a video media packet of a video stream which is received after the channel changing request is transmitted, and perform playing, and stop rectification when a sum of video timestamp interval values that are after rectification and between neighboring video media packets reaches the video timestamp difference.

Specifically, in the case where there is no unicast interaction signaling, the audio rectifying and playing sub-module 843 rectifies, according to the audio timestamp difference received by the audio timestamp difference receiving sub-module 823, a timestamp of an audio media packet of the burst audio stream received by the burst audio stream receiving sub-module 831, and performs playing; and may also need to rectify and play an audio media packet of the multicast audio stream received by the multicast audio stream receiving sub-module 833. Meanwhile, the video rectifying and playing sub-module 844 rectifies, according to the video timestamp difference received by the video timestamp difference receiving sub-module 824, the timestamp of the video media packet of the burst video stream received by the burst video stream receiving sub-module 832 and performs playing; and may also need to rectify and play the video media packet in the multicast video stream received by the multicast video stream receiving sub-module 834.

In the case where there is unicast interaction signaling, the audio rectifying and playing sub-module 843 rectifies, according to the audio timestamp difference received by the second changing response receiving sub-module 825, the timestamp of the audio media packet in the burst audio stream received by the burst audio stream receiving sub-module 831 and performs playing; and may also need to rectify and play the audio media packet in the multicast audio stream received by the multicast audio stream receiving sub-module 833. Meanwhile, the video rectifying and playing sub-module 844 rectifies, according to the video timestamp difference received by the second changing response receiving sub-module 825, the timestamp of the video media packet in the burst video stream received by the burst video stream receiving sub-module 832 and performs playing; and may also need to rectify and play the video media packet in the multicast video stream received by the multicast video stream receiving sub-module 834.

For the working mechanism of each module in this embodiment, reference is made to the description of the embodiments corresponding to FIG. 2, FIG. 3, and FIG. 4, and the details are not repeated here.

In this embodiment, in the case where there is no unicast interaction signaling, the audio timestamp difference receiving sub-module 823 receives the audio timestamp difference transmitted by the network side, and the video timestamp difference receiving sub-module 824 receives the video timestamp difference transmitted by the network side. In the case where there is unicast interaction signaling, the second changing response receiving sub-module 825 receives the audio timestamp difference and the video timestamp difference. Therefore, this embodiment is applicable to a scenario where there is no unicast interaction signaling, is also applicable to a scenario where there is unicast interaction signaling and is not limited by an application scenario. The audio rectifying and playing sub-module 843 rectifies, according to the audio timestamp difference, the timestamp of the audio media packet received by the burst audio stream receiving sub-module 831, and the timestamp of the audio media packet received by the multicast audio stream receiving sub-module 833. Meanwhile, the rectifying and playing sub-module 844 rectifies the timestamp of the video media packet received by the burst video stream receiving sub-module 832, and the timestamp of the video media packet received by the multicast video stream receiving sub-module 834. In this way, the rectified audio stream and video stream are played synchronously.

Figure 12:
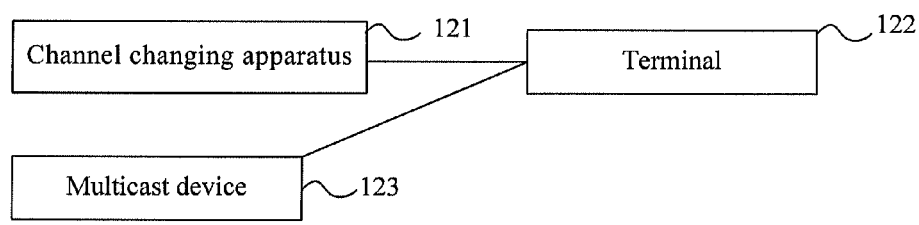
FIG. 12 is a schematic structural diagram of a channel changing system according to an embodiment of the present disclosure.

FIG. 12 is a schematic structural diagram of a channel changing system according to an embodiment of the present disclosure. As shown in FIG. 12, this embodiment includes: a channel changing apparatus 121, a terminal 122, and a multicast device 123.

The channel changing apparatus 121 may be a channel changing apparatus illustrated in FIG. 5, FIG. 6, or FIG. 7; and the terminal 122 may be a terminal illustrated in FIG. 8, FIG. 9, or FIG. 10.

The multicast terminal 123 is configured to transmit a multicast media stream to a terminal after the terminal joins in a multicast group corresponding to a target channel. In this embodiment, after transmitting a channel changing request to the channel changing apparatus 122 or the multicast device 123, the terminal 122 receives a timestamp difference and a burst media stream which are transmitted by the channel changing apparatus 121, and after joining in the multicast group, receives the multicast media stream transmitted by the multicast device 123. The timestamp difference reflects an extent to which content of the burst media stream received by the terminal is staler than that of a real-time multicast media stream of the target channel. Therefore, rectifying a timestamp of a received media stream according to the timestamp difference may increase a rate at which the terminal plays the media stream, thereby reducing a delay in playing the multicast media stream by the terminal, so that the terminal that has undergone channel changing plays the multicast media stream synchronously with the terminal that has not undergone channel changing.

Persons of ordinary skill in the art can understand that all or part of steps in the foregoing method embodiments may be completed by a program instructing relevant hardware such as a server having a processor. The program may be stored in a computer readable storage medium accessible to the server. When the programs are executed, the steps of the foregoing method embodiments are executed. The storage medium includes various media, such as a ROM, a RAM, a magnetic disk, or an optical disk, which can store program codes.

Finally, it should be noted that the foregoing embodiments are used to illustrate rather than to limit the solutions of the present disclosure. Although the present disclosure is illustrated in detail with reference to the foregoing embodiments, persons of ordinary skill in the art should understand that they still can make modifications to the solutions recorded in the foregoing embodiments, or make equivalent replacements for parts of features therein; and such modifications or replacements do not make the essence of corresponding solutions depart from the scope of the solutions of the present disclosure.

What is claimed is:

1. A channel changing method, comprising:
   recording in real time a timestamp of a media packet of a multicast media stream which enters a buffer, and a key frame which enters the buffer;
   when a channel changing request transmitted by a terminal has been detected, obtaining a first timestamp of a media packet which is of a target channel and enters the buffer at a channel changing request moment, and a second timestamp of a media packet in which a key frame which is of the target channel and is the last to enter the buffer before the channel changing request moment is located;
   determining a timestamp difference between the first timestamp and the second timestamp; and
   transmitting the timestamp difference to the terminal, and starting from the key frame, transmitting, in a unicast manner and to the terminal, a burst media stream of the target channel in the buffer to the terminal, wherein the terminal uses the timestamp difference to rectify a timestamp of a media packet of a media stream which is received after the channel changing request moment, and the media stream which is received after the channel changing request moment comprises the burst media stream.

2. The channel changing method according to claim 1, wherein transmitting the timestamp difference to the terminal comprises:
   carrying the timestamp difference in a first media packet of the burst media stream and transmitting the first media packet to the terminal.

3. The channel changing method according to claim 1, wherein transmitting the timestamp difference to the terminal comprises: carrying the timestamp difference in a channel changing response message and transmitting channel changing response message to the terminal.

4. The channel changing method according to claim 1, wherein the multicast media stream comprises a multicast video stream and a multicast audio stream; and
   the method further comprises: recording in real time a timestamp of an audio media packet of the multicast audio stream that enters the buffer, and a timestamp of a video media packet of the multicast video stream that enters the buffer;
   separately obtaining a first audio timestamp of an audio media packet which is of a target channel and enters the buffer at the channel changing request moment, and a first video timestamp of the video media packet, and a second audio timestamp of an audio media packet which is the last to enter the buffer before the channel changing request moment and a second video timestamp of a video media packet in which the key frame is located;
   separately determining an audio timestamp difference between the first audio timestamp and the second audio timestamp, and a video timestamp difference between the first video timestamp and the second video timestamp;
   transmitting the audio timestamp difference and the video timestamp difference to the terminal; and
   transmitting, in the unicast manner and to the terminal, a burst audio stream and a burst video stream which are of the target channel and in the buffer; wherein the terminal uses the audio timestamp difference and the video timestamp difference to rectify a timestamp of a media packet in an audio media stream which is received after the channel changing request, and a timestamp of a video media packet in a video media stream which is received after the channel changing request, respectively.

5. A channel changing server having a processor, comprising:
- a recording module, configured to record in real time a timestamp of a media packet of a multicast media stream which enters a buffer, and a key frame which enters the buffer;
- a timestamp obtaining module, configured to, when a channel changing request transmitted by a terminal has been detected, obtain, according to the recorded timestamp, a first timestamp of a media packet which is of a target channel and enters the buffer at a channel changing request moment, and a second timestamp of a media packet in which a key frame which is of the target channel and is the last to enter the buffer before the channel changing request moment is located;
- a timestamp difference determining module, configured to determine a timestamp difference between the first timestamp and the second timestamp by the processor;
- a transmitting module, configured to transmit the timestamp difference to the terminal, and starting from the key frame, transmitting, in a unicast manner, a burst media stream of the target channel in the buffer to the terminal; wherein the timestamp difference is used for the terminal to rectify a timestamp of a media packet in a media stream which is received after the channel changing request moment, and the media stream which is received after the channel changing request moment comprises the burst media stream.

6. The channel changing server according to claim 5, wherein the transmitting module comprises:
- a first changing responding sub-module, configured to transmit, to the terminal, a channel changing response message carrying the timestamp difference; and
- a unicasting sub-module, configured to transmit, in the unicast manner, the burst media stream of the target channel to the terminal; or the unicasting sub-module, configured to unicast the burst media stream of the target channel to the terminal, and carry the timestamp difference in a first media packet of the burst media stream and transmit the first media packet to the terminal.

7. The channel changing server according to claim 5, wherein
- the recording module comprises:
- an audio timestamp recording sub-module, configured to record in real time an audio timestamp of an audio media packet of a multicast audio stream which enters the buffer; and
- a video timestamp recording sub-module, configured to record in real time a video timestamp of a video media packet of a multicast video stream which enters the buffer;
- the timestamp obtaining module comprises:
- an audio timestamp obtaining sub-module, configured to obtain a first audio timestamp of an audio media packet which is of a target channel and enters the buffer at the channel changing request moment, and a second audio timestamp of an audio media packet which is the last to enter the buffer before the channel changing request moment; and
- a video timestamp obtaining sub-module, configured to obtain a first video timestamp of a video media packet which is of a target channel and enters the buffer at the channel changing request moment, and a second video timestamp of a video media packet in which the key frame which is the last to enter the buffer before the channel changing request moment is located;
- the timestamp difference determining module comprises:
- an audio timestamp difference determining sub-module, configured to determine an audio timestamp difference between the first audio timestamp and the second audio timestamp; and
- a video timestamp difference determining sub-module, configured to determine a video timestamp difference between the first video timestamp and the second video timestamp; and
- the transmitting module comprises:
- a second changing responding sub-module, configured to transmit, to the terminal, a channel changing response message carrying the audio timestamp difference and the video timestamp difference;
- an audio unicasting sub-module, configured to transmit a burst audio stream in the unicast manner to the terminal, and further configured to carry the audio timestamp difference in a first audio media packet of the burst audio stream and transmit the audio media packet to the terminal; and
- a video unicasting sub-module, configured to transmit a burst video stream in the unicast manner to the terminal, and further configured to carry the video timestamp difference in a first video media packet of the burst video stream and transmit the video timestamp difference to the terminal.

8. A channel changing system, comprising: a channel changing server and a terminal, wherein the terminal is configured to transmit a channel changing request to the channel changing server wherein the channel changing request carries information of a target channel;
- the channel changing server is configured to record in real time a timestamp of a media packet of a multicast media stream which enters a buffer, and a key frame which enters the buffer; when a channel changing request transmitted by a terminal has been detected, obtain a first timestamp of a media packet which is of a target channel and enters the buffer at a channel changing request moment, and a second timestamp of a media packet in which a key frame which is of the target channel and is the last to enter the buffer before the channel changing request moment is located; determine a timestamp difference between the first timestamp and the second timestamp; and transmit the timestamp difference to the terminal, and starting from the key frame, transmit, in a unicast manner and to the terminal, a burst media stream of the target channel in the buffer to the terminal;
- the terminal if further configured to receive the timestamp difference sent by the channel changing server, and rectify a timestamp of a media packet of a media stream which is received after the channel changing request moment, and the media stream which is received after the channel changing request moment comprises the burst media stream.

9. The channel changing system according to claim 8, wherein the channel changing server is configured to carry the timestamp difference in a first media packet of the burst media stream and transmit the first media packet to the terminal.

10. The channel changing system according to claim 8, wherein the channel changing server is configured to carry the timestamp difference in a channel changing response message and transmit the channel changing response message to the terminal.

11. The channel changing system according to claim 8, wherein the terminal further configured to
- rectify a timestamp of a first media packet in the media stream according to the timestamp difference, and performing playing;

according to a rectified timestamp of a previous media packet of a current media packet under rectification, a timestamp of the current media packet under rectification, and a preset timestamp interval value after rectification, rectify the timestamp of the current media packet under rectification and performing playing, and stop rectification when the sum of the timestamp interval values that are after rectification and between neighboring media packets in the rectified media stream reaches the timestamp difference.

* * * * *